Dec. 21, 1926.

A. T. KASLEY 1,611,752

TURBINE ROTOR

Filed April 11, 1925

A.T. Kasley
INVENTOR

BY D.C. Davis
ATTORNEY

WITNESSES

Patented Dec. 21, 1926.

1,611,752

UNITED STATES PATENT OFFICE.

ALEXANDER T. KASLEY, OF MOORE, PENNSYLVANIA, ASSIGNOR TO WESTINGHOUSE ELECTRIC & MANUFACTURING COMPANY, A CORPORATION OF PENNSYLVANIA.

TURBINE ROTOR.

Application filed April 11, 1925. Serial No. 22,416.

My invention relates to elastic fluid turbines, more particularly to the construction of the rotors thereof, and has for its object to provide apparatus of the character designated which shall have the required strength to withstand the strains of service and the parts of which shall permanently maintain their original relative positions.

Figure 1:
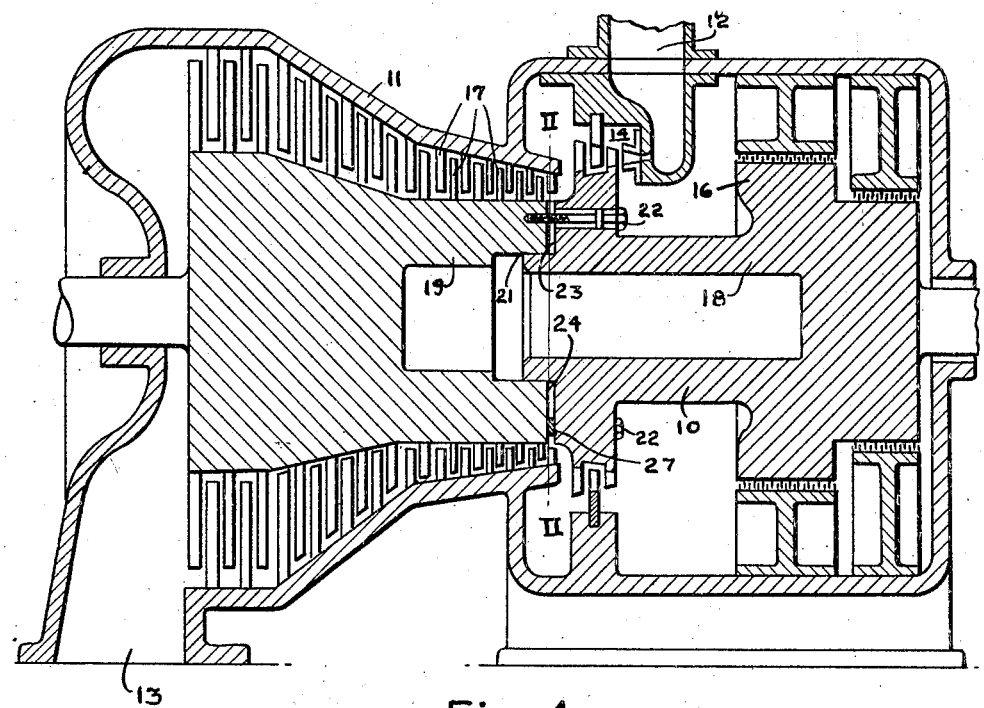
Figure 2:
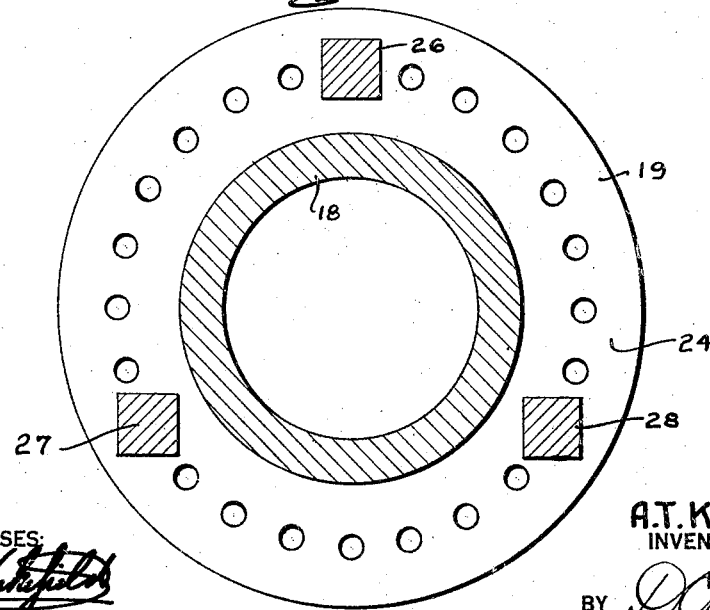

Apparatus embodying features of my invention is illustrated in the accompanying drawings forming a part of this specification in which Fig. 1 is a sectional view of an elastic fluid turbine having a rotor made in accordance with my invention, and Fig. 2 is a sectional view taken along the line II—II of Fig. 1.

In the manufacture of rotors for large elastic fluid turbines it has become impractical to construct a rotor from a single forging on account of the large size of the metal billet to be handled and on account of the difficulty of obtaining a homogeneous texture of metal throughout the forging. It has accordingly been necessary to construct the rotor from a plurality of separate forgings, securing them together by means of bolts or other holding devices.

In securing the parts of the rotor together it has been customary to machine the abutting surfaces as smoothly as possible and to then draw them tightly together with bolts during assembly. To add to the rigidity of the structure, cooperating forgings may be turned and bolted so that one part fits into the other, forming a spigot connection. While such assemblies are apparently all that could be desired in the way of rigidity, instances have occurred wherein the individual forgings have become relatively displaced in service, resulting in a serious unbalance of the rotor.

I have found this action to be due to deformation of the rotor structure in service. This deformation may result from internal stresses in the metal incidental to temperature changes, acting in concert with stresses due to centrifugal force set up in the rotor, and to the torque of the rotor in operation.

The cooperating parts of the rotor being tightly held together with contacting faces, deformation of the metal in the parts may result in a bending of the rotor, displacing its center of gravity with respect to its axis of rotation. When such a condition occurs it may be corrected by inserting balancing weights at proper positions on the rotor body.

The most serious result of deformation of the rotor occurs however, when said deformation takes the form of two areas on contacting faces relatively higher than the adjacent areas and opposite, or nearly opposite, each other across the diameter of the rotor. Under such a condition the two parts of the rotor, in turning about the rotor axis, rock about the two high spots and the addition of balancing weights to the rotor aggravates rather than remedies the trouble.

In accordance with my invention I apply the well-known advantages of a three point suspension or support for a body to the assembly of the parts of a rotor. Instead of drawing adjacent surfaces of the rotor tightly together as has formerly been done, I interpose three bearing points therebetween and locate the bearing points equidistant around the rotor. With this construction, no rocking can occur and if the rotor deforms in service it results in a bending, which can be balanced by suitable weights. The bearing points may be conveniently formed by interposing shims between the cooperating faces of the rotor.

Referring now to the drawing for a more detailed description of my invention, I show, in Fig. 1, an elastic fluid turbine having a rotor 10 and a casing 11. Motive fluid is admitted to the turbine at 12 and after being expanded therein is exhausted at 13. At 14 I show an impulse stage and at 16 a dummy piston carried by the rotor 10. At 17 is shown a plurality of reaction stages embodying a plurality of rows of moving blades also carried by the rotor 10. In the manufacture of a turbine such as is illustrated, it has been found impractical to construct the rotor of a single forging and it has accordingly become the custom to construct it of two or more individual forgings and to secure the individual forgings together by means of bolts or otherwise. In the drawing I show the rotor 10 as being comprised of two forgings 18 and 19. The forging 18 is shaped to accommodate the impulse stage 14 and the dummy piston 16. The forging 19 carries the plurality of rows of reaction blading 17. The forgings 18 and 19 are spigoted together at 21 with a pressed fit and a series of bolts 22—22 is employed to draw the forgings toward each other.

Each of the forgings 18 and 19 is provided with a plane surface adjacent the other forging as shown at 23 and 24. The surfaces 23 and 24 are carefully machined so that upon assembly they are parallel with each other. I show, interposed between the surfaces 23 and 24, three bearing points formed by shims 26, 27 and 28. These bearing points are spaced equidistantly around the rotor so that when the bolts 22 are drawn up, the cooperating forgings form a unitary structure which is free from rocking. It is to be distinctly understood that while I show the bearing points as formed by shims, many other ways of forming the bearing points will suggest themselves to those skilled in the art and the invention is not limited specifically to shims but covers a built-up rotor having its cooperating parts secured together with three bearing points therebetween. When the rotor is subjected to temperature changes, to stresses due to centrifugal force, to varying torque and to other incidents of service, any permanent deformation of the rotor can be balanced by adding suitable weights.

From the foregoing it will be apparent that I have devised an improved turbine rotor comprised of a plurality of forgings and have included therein, means effective for preventing a relative displacement of the forgings in operation.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A built up turbine rotor comprising a plurality of individual and aligned forgings secured together by bolts and having a plurality of bearing elements disposed between the forgings and spacing the forgings axially.

2. In a turbine rotor, the combination of two cooperating aligned parts, a plurality of bolts for drawing the parts together and a plurality of bearing elements disposed between the parts and spacing the parts axially.

3. In a turbine rotor, the combination of two cooperating aligned parts, a plurality of bolts for drawing the parts together and three bearing elements disposed between the parts and spacing the parts axially.

4. In a turbine rotor, the combination of two cooperating aligned parts, a plurality of bolts for drawing the parts together and three bearing elements spaced equidistantly around the rotor between the parts and spacing the parts axially.

5. In a turbine rotor, a section of the rotor carrying impulse blading, a section of the rotor carrying reaction blading, a spigot connection between the sections, cooperating plane surfaces formed on each of the sections, a plurality of bolts cooperating between the sections for drawing them toward each other, and three bearing points formed by shims disposed between the sections equidistantly around the rotor preventing contact between cooperating plane surfaces of the sections.

6. A built-up turbine rotor comprising a plurality of rotor sections and a transverse joint between sections including three spacing members for spacing the sections axially and means for drawing said sections together.

7. In a turbine, a rotor built up of two forgings, one of said forgings comprising a dummy piston and an impulse blade carrying element of the rotor and the other of said forgings comprising a reaction blade carrying element thereof, parallel plane surfaces formed on adjacent sides of the forgings, a plurality of bolts cooperating between the forgings and drawing the plane surfaces toward each other, and three spacing pieces disposed between the surfaces and spaced equidistantly around the rotor preventing contact between the plane surfaces.

8. In a turbine, a rotor built up of two forgings, one of said forgings comprising a dummy piston and an impulse blade carrying element of the rotor and the other of said forgings comprising a reaction blade carrying element thereof, parallel plane surfaces formed on adjacent sides of the forgings, a plurality of bolts cooperating between the forgings and drawing the plane surfaces toward each other, and means providing three bearing points between the opposed faces.

9. A built-up turbine rotor comprising a plurality of rotor sections disposed longitudinally in axial alignment and a joint therebetween disposed transversely of the axis and including three bearing elements between the sections in planes transverse of the axis for maintaining the axial alignment of the sections.

10. In a rotor, the combination of two cooperating aligned parts and a transverse joint for the parts including three bearing elements between the parts, said bearing elements being disposed transversely of the axis of the rotor and maintaining the parts in axial alignment, and means for drawing the parts together.

In testimony whereof, I have hereunto subscribed my name this second day of April, 1925.

ALEXANDER T. KASLEY